US012637958B2

(12) United States Patent

Kippel et al.

(10) Patent No.: US 12,637,958 B2

(45) Date of Patent: May 26, 2026

(54) SYSTEM AND METHOD FOR REGULATING VELOCITY OF GASES IN A TURBOMACHINE

(71) Applicant: GE Vernova Infrastructure Technology LLC, Greenville, SC (US)

(72) Inventors: Bradly Aaron Kippel, Greenville, SC (US); Raymond Pang, Glenville, NY (US); Scott Richard Baker, Greenville, SC (US); Harold Lamar Jordan, Jr., Greenville, SC (US); Rex Allen Morgan, Simpsonville, SC (US); Kamlesh Mundra, Clifton Park, NY (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/326,801

(22) Filed: May 21, 2021

(65) Prior Publication Data

US 2021/0324757 A1 Oct. 21, 2021

Related U.S. Application Data

(62) Division of application No. 15/383,043, filed on Dec. 19, 2016, now abandoned.

(51) Int. Cl.

| | |
|---|---|
| *F01D 17/14* | (2006.01) |
| *F01D 25/30* | (2006.01) |
| *F02C 9/20* | (2006.01) |

(52) U.S. Cl.

CPC ............. *F01D 17/14* (2013.01); *F01D 25/30* (2013.01); *F02C 9/20* (2013.01); *F05D*

*2220/32* (2013.01); *F05D 2270/306* (2013.01); *F05D 2270/313* (2013.01); *F05D 2270/331* (2013.01)

(58) Field of Classification Search

None

See application file for complete search history.

(56) References Cited

U.S. PATENT DOCUMENTS

| | | | |
|---|---|---|---|
| 4,208,882 A | 6/1980 | Lopes et al. | |
| 4,517,809 A | 5/1985 | Hoyt | |
| 5,134,788 A * | 8/1992 | Stibbe | F26B 21/02 34/524 |

(Continued)

OTHER PUBLICATIONS

Lefebvre, Arthur H. & Ballal, Dilip R. "Gas Turbine Combustion: Alternative Fuels and Emissions," 3rd ed. Boca Raton: Taylor & Francis Group, 2010, pp. 83-84. (Year: 2010).*

(Continued)

*Primary Examiner* — Phutthiwat Wongwian

*Assistant Examiner* — Jacek Lisowski

(74) *Attorney, Agent, or Firm* — Dority & Manning, P.A.

(57) ABSTRACT

The present disclosure is direct to a system for regulating a velocity of gases in a turbomachine. The system includes an exhaust section of the turbomachine. The system also includes a damper having an actuator and a restriction. The damper is positioned within the exhaust section and is operable to adjust the velocity of the gases based on a position of the restriction. The system further includes a controller communicatively coupled to the damper. The controller is configured to control the position of the restriction to regulate the velocity of the gases relative to a predetermined velocity range.

16 Claims, 3 Drawing Sheets

(56)  References Cited

U.S. PATENT DOCUMENTS

| 5,279,358 | A  * | 1/1994 | Hannis ................. F01D 17/105 |
| | | | 60/39.5 |
| 5,867,987 | A | 2/1999 | Halimi et al. |
| 6,224,480 | B1 | 5/2001 | Le et al. |
| 6,442,941 | B1 | 9/2002 | Anand et al. |
| 6,543,234 | B2 | 4/2003 | Anand et al. |
| 6,829,898 | B2 | 12/2004 | Sugishita |
| 7,555,890 | B2 * | 7/2009 | Kurihara .............. F22B 1/1815 |
| | | | 60/39.5 |
| 8,209,951 | B2 | 7/2012 | Hibshman, II |
| 8,844,262 | B2 | 9/2014 | Sutterfield |
| 9,103,279 | B2 | 8/2015 | Zhang et al. |
| 9,435,258 | B2 | 9/2016 | Janapaneedi et al. |
| 9,670,843 | B2 * | 6/2017 | Pang ......................... F01N 3/20 |
| 10,253,652 | B2 | 4/2019 | Mathai et al. |
| 2005/0034445 | A1 * | 2/2005 | Radovich ............... F01K 23/10 |
| | | | 60/39.182 |
| 2012/0180485 | A1 | 7/2012 | Smith et al. |
| 2013/0098313 | A1 | 4/2013 | Pang |
| 2013/0104816 | A1 | 5/2013 | Nenmeni et al. |
| 2013/0327052 | A1 | 12/2013 | O'Neill et al. |
| 2014/0121935 | A1 | 5/2014 | Zhang et al. |
| 2014/0298816 | A1 | 10/2014 | Rendo et al. |
| 2015/0007579 | A1 * | 1/2015 | Curran .................... F01K 23/10 |
| | | | 60/39.182 |
| 2015/0016964 | A1 | 1/2015 | Reiter et al. |
| 2016/0061110 | A1 * | 3/2016 | Whelan .................. F23R 3/286 |
| | | | 60/737 |
| 2018/0058334 | A1 | 3/2018 | Mathai et al. |

OTHER PUBLICATIONS

Volumetric Flow Rate, Wikipedia, the Free Encyclopedia, 2015, 3 Pages. Retrieved on Feb. 27, 2020 from Internet Archive Wayback Machine. https://en.wikipedia.org/wiki/Voumetric_flow_rate>.

* cited by examiner

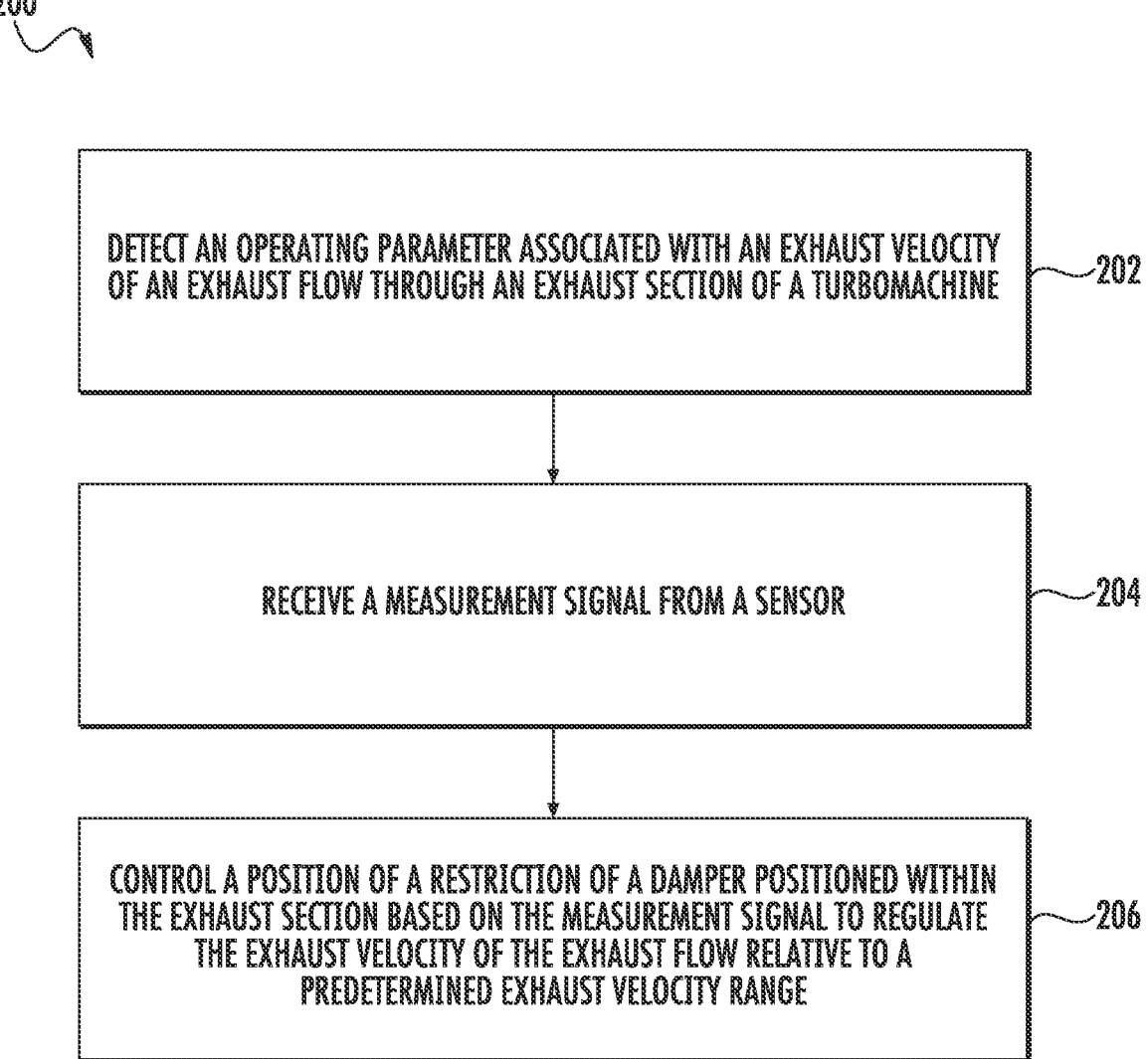

200

DETECT AN OPERATING PARAMETER ASSOCIATED WITH AN EXHAUST VELOCITY OF AN EXHAUST FLOW THROUGH AN EXHAUST SECTION OF A TURBOMACHINE — 202

RECEIVE A MEASUREMENT SIGNAL FROM A SENSOR — 204

CONTROL A POSITION OF A RESTRICTION OF A DAMPER POSITIONED WITHIN THE EXHAUST SECTION BASED ON THE MEASUREMENT SIGNAL TO REGULATE THE EXHAUST VELOCITY OF THE EXHAUST FLOW RELATIVE TO A PREDETERMINED EXHAUST VELOCITY RANGE — 206

*FIG. 4*

SYSTEM AND METHOD FOR REGULATING VELOCITY OF GASES IN A TURBOMACHINE

This application is a divisional of U.S. patent application Ser. No. 15/383,043, filed on Dec. 19, 2016, the disclosure of which is incorporated by reference herein in its entirety.

FIELD

The present disclosure generally relates to turbomachines. More particularly, the present disclosure relates systems and methods for regulating velocity of gases in turbomachines.

BACKGROUND

A gas turbine engine generally includes an inlet section, a compressor, one or more combustors, a turbine, and an exhaust section. Air enters the gas turbine engine through the inlet section. The compressor progressively increases the pressure the air therein and supplies this compressed air to the combustors. The compressed air and a fuel (e.g., natural gas) mix and burn within the combustors to generate high pressure and high temperature combustion gases. The combustion gases flow from the combustors into the turbine where they expand to produce work. For example, expansion of the combustion gases in the turbine may rotate a rotor shaft connected, e.g., to a generator to produce electricity. The combustion gases then exit the gas turbine engine via the exhaust section as exhaust gases.

Various gas turbine engine components may be exposed to the flow of combustion and exhaust gases. For example, vanes and rotor blades in the turbine may be exposed to the flow of combustion gases. In this respect, there may be a limit to the velocity of the gases to which certain gas turbine components, such as the vanes and rotors blades, may be exposed. These limits may be exceeded when the ambient air entering the inlet section is relatively cold. Furthermore, the velocity limits may also be exceeded when the inlet section conditions the air entering the gas turbine engine in a manner that lowers the temperature thereof.

Conventional systems and methods regulating the velocity the gases flowing through the gas turbine engine generally do so by impeding or restricting the air flow entering the inlet section. Impeding the flow of air entering the inlet section reduces the mass flow rate of air through the gas turbine engine, which results in a relatively large impact on the overall performance and efficiency of the gas turbine engine.

BRIEF DESCRIPTION

Aspects and advantages of the technology will be set forth in part in the following description, or may be obvious from the description, or may be learned through practice of the technology.

In one aspect, the present disclosure is directed to a system for regulating a velocity of gases in a turbomachine. The system includes an exhaust section of the turbomachine. The system also includes a damper having an actuator and a restriction. The damper is positioned within the exhaust section and is operable to adjust the velocity of the gases based on a position of the restriction. The system further includes a controller communicatively coupled to the damper. The controller is configured to control the position of the restriction to regulate the velocity of the gases relative to a predetermined velocity range.

In another aspect, the present disclosure is directed to a method for regulating a velocity of gases in a turbomachine. The method includes detecting, with a sensor in operative association with the turbomachine, an operating parameter associated with the velocity of the gases flowing through the turbomachine. The method also includes receiving, with a controller, a measurement signal from the sensor. The signal is associated with the operating parameter. The method further includes controlling, with the controller, a position of a restriction of a damper positioned within an exhaust section of the turbomachine based on the measurement signal to regulate the velocity of the gases relative to a predetermined velocity range. The damper is operable to adjust the velocity of the gases based on a position of the restriction.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended FIGS., in which:

FIG. 4 is flow chart illustrating a method for regulating a velocity of gases within a gas turbine engine in accordance with embodiments of the present disclosure.

Figure 1:
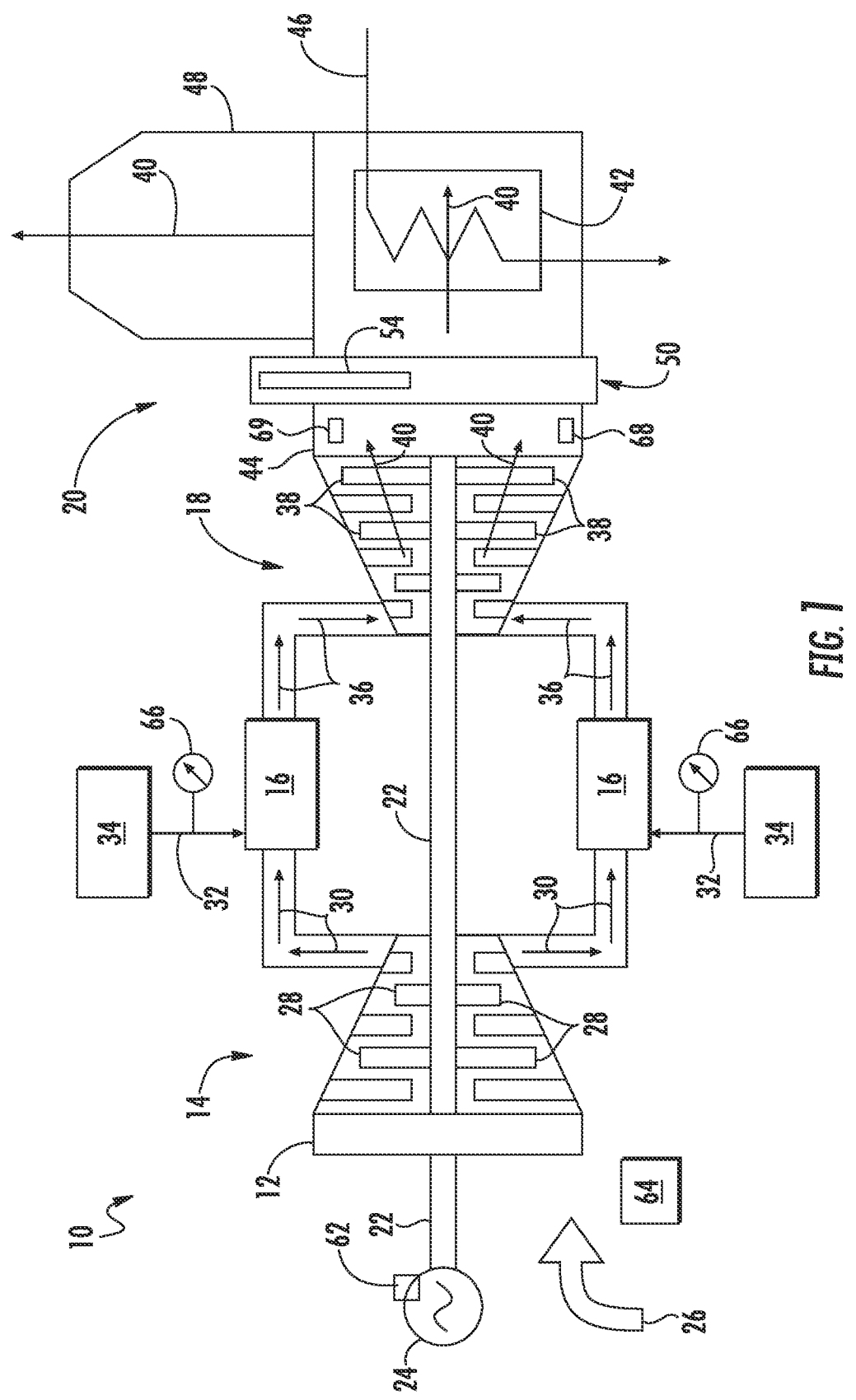
FIG. 1 is a schematic view of an exemplary gas turbine engine in accordance with embodiments of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Although an industrial or land-based gas turbine is shown and described herein, the present technology as shown and described herein is not limited to a land-based and/or industrial gas turbine unless otherwise specified in the claims. For example, the technology as described herein may be used in any type of turbomachine including, but not limited to, aviation gas turbines (e.g., turbofans, etc.), steam turbines, and marine gas turbines.

Now referring to the drawings, wherein identical numerals indicate the same elements throughout the figures, FIG. 1 schematically illustrates an exemplary gas turbine engine 10. As depicted therein, the gas turbine engine 10 includes an inlet section 12, a compressor 14, one or more combustors 16, a turbine 18, and an exhaust section 20. The compressor 14 and the turbine 18 may be coupled by a shaft 22, which may be a single shaft or a plurality of shaft segments coupled together. The shaft 22 may also couple the turbine 18 to a generator 24.

During operation, the gas turbine engine 10 produces mechanical rotational energy, which may, e.g., be used to drive the generator 24. More specifically, air 26 enters the inlet section 12 of the gas turbine engine 10. From the inlet section 12, the air 26 flows into the compressor 14, where one or more rows of compressor rotor blades 28 progressively compress the air 26 to provide compressed air 30 to each of the combustors 16. The compressed air 30 in the combustors 16 mixes with a fuel 32 (e.g., natural gas) supplied by a fuel supply 34. The resulting fuel-air mixture burns in the combustors 16 to produce high temperature and high pressure combustion gases 36. From the combustors 16, the combustion gases 36 flow through the turbine 18, where one or more rows of turbine rotor blades 38 extract kinetic and/or thermal energy therefrom. This energy extraction rotates the shaft 22, thereby creating mechanical rotational energy for powering the compressor 14 and/or the generator 24. The combustion gases 36 exit the gas turbine engine 10 through the exhaust section 20 as exhaust gases 40.

In the embodiment shown in FIG. 1, the exhaust section 20 includes a heat recovery steam generator (HRSG) 42 or other similar heat exchanger. More specifically, an exhaust duct 44 may fluidly couple the HRSG 42 and the turbine 18. In this respect, the exhaust gases 40 exiting the gas turbine engine 10 may heat a fluid 46 (e.g., steam) for use a steam turbine or other turbomachine (not shown). After flowing through the HRSG 42, the exhaust gases 40 may exit the exhaust system through an exhaust stack 48. In alternate embodiments, however, the exhaust section 20 may not include the HRSG 42. In this respect, the exhaust gases 40 may flow through the exhaust duct 44 and directly into the ambient air. That is, certain embodiments of the exhaust section 20 may only include the exhaust duct 44 or other similar conduit through which the exhaust gases 40 may flow from the turbine 18 to the ambient air.

The exhaust section 20 also includes a damper 50. In the embodiment shown in FIG. 1, the damper 50 is positioned in the exhaust duct 44 between the turbine 18 and the HRSG 42 (i.e., upstream of the HRSG 42). In alternate embodiments, however, the damper 50 may be positioned in the HRSG 42, the exhaust stack 48 (i.e., downstream of the HRSG 42), or any other suitable position in the exhaust section 20.

Figure 2:
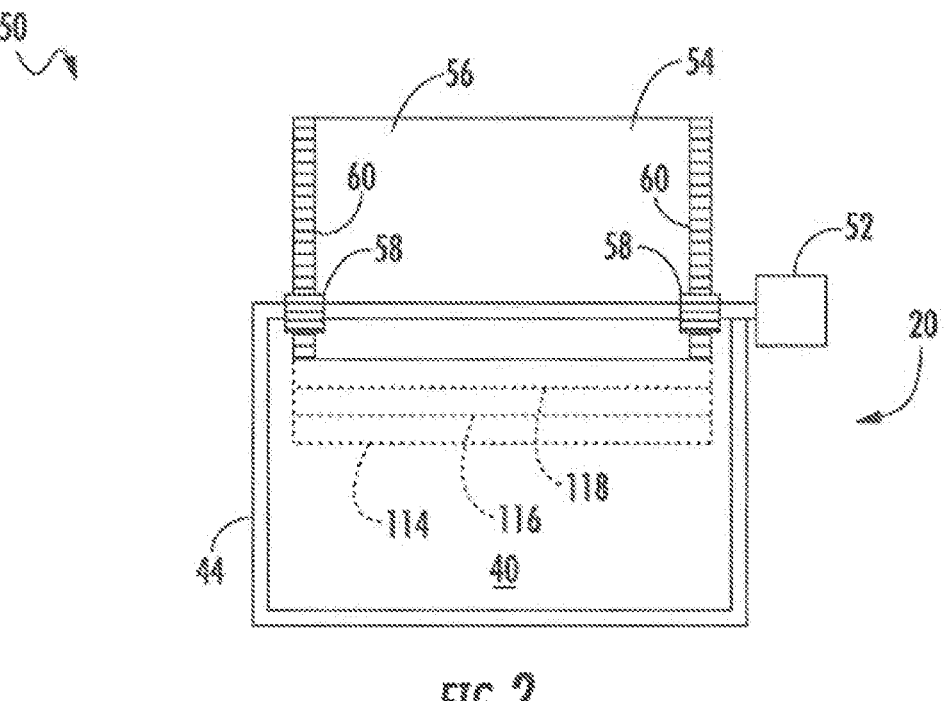
FIG. 2 is a front view of an exemplary damper in accordance with embodiments of the present disclosure.

The damper 50 may adjustably impede or restrict the flow of the exhaust gases 40 through the exhaust duct 44. As shown in FIG. 2, the damper 50 generally includes an actuator 52 and one or more adjustable restrictions 54. More specifically, the actuator 52 moves the restrictions 54 between two or more positions within the exhaust duct 44. Any suitable combination of gears, sprockets, chains, linkages, or other components may transmit motion from the actuator 52 to the restriction 54. The restrictions 54 may impede the flow of the exhaust gases 40 to various extents based on the position thereof. As will be discussed in greater detail below, a velocity of the gases 36, 40 within the gas turbine engine 10 may be regulated based on the position of the restrictions 54.

In the exemplary embodiment shown in FIG. 2, the damper 50 is a guillotine damper. In such embodiments, the restriction 54 is a vertically moveable door 56. In this respect, the actuator 52 that adjusts the vertical position of the door 56. As shown, a pair of pinion gears 58 are coupled to the actuator 52 (e.g., a pneumatic or hydraulic cylinder, an electric motor, etc.). The pinion gears 58 engage corresponding racks 60 coupled to the door 56. During operation of the damper 50, the actuator 52 rotates the pinion gears 58, which vertically move the racks 60 and the door 56. In alternate embodiments, the restriction 54 may be one or more louvers, diverters, butterfly valves, poppets, irising orifices, or any other suitable type of restriction. Furthermore, the damper 50 may be any suitable structure or device that may adjustably impedes or restricts the flow of the exhaust gases 40 through the exhaust duct 44.

Referring again to FIG. 1, the gas turbine engine 10 may include various sensors. As shown, for example, the gas turbine engine 10 may include a load sensor 62, an ambient temperature sensor 64, a fuel flow sensor 66, an exhaust pressure sensor 68, and an exhaust gas velocity sensor 69. In alternate embodiments, however, the gas turbine engine 10 may include only some of the sensors 62, 64, 66, 68, 69 or none of the sensors 62, 64, 66, 68, 69. Furthermore, the gas turbine engine 10 may include other sensors in addition to or lieu of the sensors 62, 64, 66, 68, 69.

The load sensor 62 that detects a load on the gas turbine engine 10. In the embodiment shown in FIG. 1, the load on the gas turbine engine 10 is the generator 24. In this respect, the load sensor 62 may be operatively associated with the generator 24. As such, the load sensor 62 may be an ammeter that detects the amount of electricity produced by the generator 24. In alternate embodiments, the load sensor 62 may be operatively associated with the shaft 22. In this respect, the load sensor 62 may be a Hall Effect sensor that detects a rotational speed of the shaft 22. The rotational speed of the shaft 22 may be used to determine the load of the gas turbine engine 10. Nevertheless, the load sensor 62 may be any suitable sensor for detecting the load on the gas turbine engine 10.

The ambient temperature sensor 64 detects a temperature of ambient air (e.g., the air 26 entering the inlet section 12). In this respect, the ambient temperature sensor 64 is exposed to the ambient air. The ambient temperature sensor 64 may be a thermistor, thermocouple, or any other suitable temperature sensor.

The fuel flow sensor 66 detects a flow rate or pressure of the fuel 32 flowing from the fuel supply 34 to the combustors 16. As shown in FIG. 1, the fuel flow sensor 66 is operatively associated with and in fluid communication with the fuel 32 flowing to the combustors 16. For example, the fuel flow sensor 66 may be an orifice meter, a turbine flowmeter, a vortex flowmeter, or any other suitable type of fuel flow sensor.

The exhaust pressure sensor 68 detects a pressure of the exhaust gases 40 within the exhaust section 20. In this respect, the exhaust pressure sensor 68 is operatively associated with the exhaust section 20 and in fluid communication with the exhaust gases 40. In the embodiment shown in FIG. 1, the exhaust pressure sensor 68 is positioned within the exhaust duct 44. In alternate embodiments, however, the exhaust pressure sensor 68 may be positioned in any suitable location within the exhaust section 20. The exhaust pressure sensor 68 may be a diaphragm pressure transducer or any other suitable type of pressure sensor.

The exhaust velocity sensor 69 detects a velocity of the exhaust gases 40 within the exhaust section. In this respect, the exhaust velocity sensor 69 is exposed to the exhaust gases 40. The exhaust velocity sensor 69 may be a flow meter, a pitot tube, or any other suitable velocity sensor.

Figure 3:
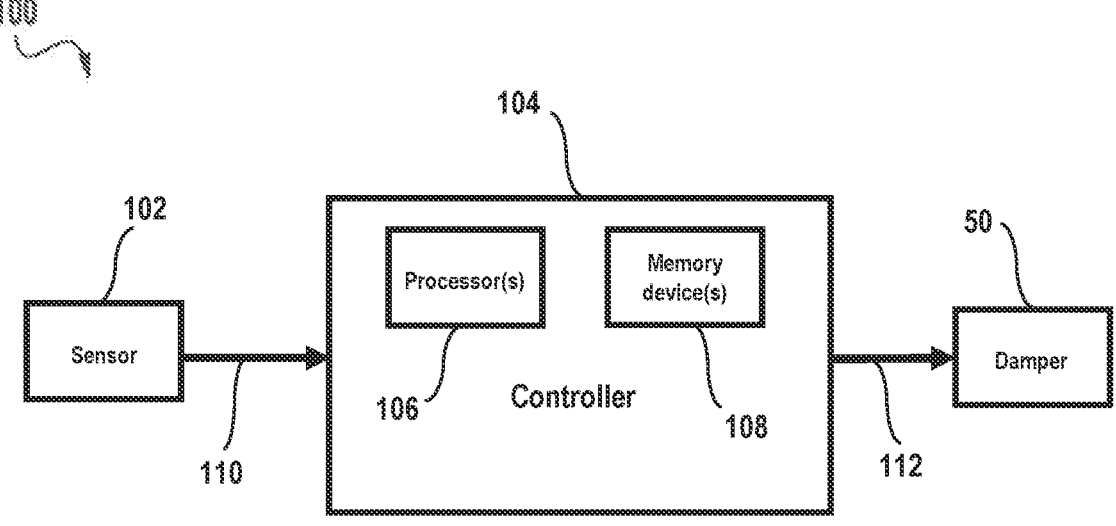
FIG. 3 is schematic view of a system for regulating a velocity of gases within a gas turbine engine in accordance with embodiments of the present disclosure.

FIG. 3 illustrates a system 100 for regulating the velocity of the gases 36, 40 within the gas turbine engine 10 in accordance with embodiments of the present disclosure. As will be discussed in greater detail below, the system 100 controls the position of the restrictions 54 of the damper 50 to regulate the velocity of the gases 36, 40 relative to a predetermined velocity range.

As shown, the system 100 includes a sensor 102 for detecting an operating parameter of the gas turbine engine 10. The operating parameter is associated with or is indicative of the velocity of the gases 36, 40. For example, the operating parameter may the load on the gas turbine engine 10, the temperature of ambient air, the flow rate or pressure of the fuel 32, the pressure of the exhaust gases 40, or the velocity of the exhaust gases 40. In this respect, the sensor 102 may correspond to the load sensor 62, the ambient temperature sensor 64, the fuel flow sensor 66, the exhaust pressure sensor 68, or the exhaust velocity sensor 69. In alternate embodiments, the sensor 102 may correspond to sensors not shown in FIG. 1 and the operating parameter may be any suitable operating parameter. Although only one sensor 102 is shown in FIG. 3, the system 100 may include more sensors.

The system 100 also includes a controller 104 communicatively coupled to one or more components of the system 100 and/or the gas turbine engine 10, such as the sensor 102 and the damper 50. The controller 104 may also be communicatively coupled to any other sensors included in the system 100. In certain embodiments, the controller 104 may correspond to a turbine controller (not shown) of the gas turbine engine 10. Alternately, the controller 104 may be a separate processing device of the gas turbine engine 10 in addition to the turbine controller.

In general, the controller 104 may comprise any suitable processor-based device known in the art, such as a computing device or any suitable combination of computing devices. In this respect, the controller 104 may include one or more processor(s) 106 and associated memory device(s) 108 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 108 of the controller 104 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 108 may generally be configured to store suitable computer-readable instructions that, when executed by the processor(s) 106, cause the controller 104 to perform various computer-implemented functions, such as one or more aspects of the method 200 described below with reference to FIG. 4. In addition, the controller 104 may also include various other suitable components, such as a communications circuit or module, one or more input/output channels, a data/control bus, and/or the like.

As indicated above, the controller 104 is communicatively coupled to the sensor 102, e.g., via a wired or wireless connection. In this respect, the sensor 102 may transmit measurement signals 110 associated with the operating parameter to the controller 104. The controller 104 may then be configured to determine the velocity of the gases 36, 40 based on the measurement signals 110 received from the sensor 102. For example, the controller 104 may include a look-up table or suitable mathematical formula stored within its memory 108 that correlates the operating parameter measurements to the velocity of the gases 36, 40. In some embodiments, the velocity of the gases 36, 40 may be based on multiple operating parameters in embodiments of the system 100 having multiple sensors.

The controller 104 may also be communicatively coupled to the damper 50, e.g., via a wired or wireless connection. In this respect, the controller 104 may transmit control signals 112 to the damper 50. The control signals 112 indicate the position to the actuator 52 should move the restriction 54. As will be discussed in greater detail below, the controller 104 may generate the control signals 112 based on the measurement signals 110 received from the sensor 102.

The controller 104 is configured to control the position of the restrictions 54 to regulate the velocity of gases 36, 40 relative to a predetermined velocity range. For example, upon receiving the measurement signals 110 from the sensor 102, the controller 104 may be configured to compare the monitored velocity to a predetermined velocity range defined for the gases 36, 40. When the monitored velocity exceeds a maximum velocity or threshold for the velocity range, the velocity of the gases 36, 40 may be too high. In such instances, the controller 104 may be configured to control (e.g., via the control signals 112) the position of the restriction 54 such that the velocity of the gases 36, 40 is reduced. When the monitored velocity falls below a minimum velocity or threshold for the velocity range, the velocity of gases 36, 40 may be too low. In such instances, the controller 104 may be configured to control (e.g., via the control signals 112) the position of the restrictions 54 such that the velocity of the gases 36, 40 is increased.

The embodiment of the damper 50 shown in FIGS. 1 and 2, the restriction 54 is the vertically moveable door 56. In this respect, the actuator 52 may move the door 56 downward to reduce the velocity of the gases 36, 40. More specifically, moving the door 56 downward increases the extent to which the door 56 impedes the flow of the exhaust gases 40. This increases a back pressure in gas turbine engine 10, which decreases the velocity of the gases 36, 40. Conversely, the actuator 52 may move the door 56 upward to increase the velocity of the gases 36, 40. In particular, moving the door 56 upward decreases the extent to which the door 56 impedes the flow of the exhaust gases 40. This decreases the back pressure in gas turbine engine 10, which decreases the velocity of the exhaust gases 40.

The restriction 54 may be moveable between an unrestricted position and a restricted position to regulate the velocity of the gases 36, 40. In general, the restrictions 54 provide no or negligible impedance of the exhaust gases 40 when in the unrestricted position. Conversely, the restrictions 54 impede of the exhaust gases 40 to the maximum extent when in the restricted position. FIG. 2, for example, shows the door 56 is in the unrestricted position. That is, the door 56 is in the restricted position when the door 56 is in the highest position. Dashed lines 114 indicate the restricted position of the door 56. In this respect, the door 56 is in the unrestricted position when the door 56 is in the lowest position.

In certain embodiments, the restrictions 54 may be positioned in either the restricted position or the unrestricted position. More specifically, the actuator 52 may move the restriction 54 to the restricted position when the velocity of the gases 36, 40 exceeds the maximum velocity threshold. The actuator 52 may move the restriction 54 to the unrestricted position when the velocity of the gases 36, 40 drops below the maximum velocity threshold. Alternately, the actuator 52 may move the restriction 54 to the unrestricted position only when the velocity of the gases 36, 40 drops below the minimum velocity threshold.

In other embodiments, the restrictions 54 may be positioned the unrestricted position, the restricted position, or one or more intermediate positions located between the unrestricted and restricted positions. The intermediate positions may be discrete positions located between the unrestricted and restricted positions. As shown in FIG. 2, for example, the door 56 may be positioned at different intermediate positions respectively identified by dashed lines 116 and 118. Alternately, the intermediate positions may be any positions located between the unrestricted and restricted positions.

The controller 104 may be configured to determine which of the unrestricted, the restricted, or intermediate positions in which the restriction 54 should be located based on a look-up table stored on the memory 108. More specifically, the look-up table may include a first table of values and a second table of values. Each value in the first table may correspond to the velocity of the gases 36, 40. Similarly, each value in the second table may correspond to one of the unrestricted, the restricted, or intermediate positions. As such, the controller 104 may select a first value from the first table of values based on the velocity of the gases 36, 40. The controller 104 may then determine the corresponding position of the restriction 54 from the second table based on the selected first value. In alternate embodiments, however, controller 104 may be configured to determine the position of the restriction 54 using one or more mathematical functions.

FIG. 4 illustrates a method 200 for regulating the velocity of the gases 36, 40 within of the gas turbine engine 10 in accordance with embodiments of the present disclosure.

In step 202, the operating parameter associated with the velocity of the gases 36, 40 is detected. For example, the sensor 102 may detect the operating parameter and generate the measurement signals 110 indicative of the operating parameter. As mentioned above, the operating parameter may be the load on the gas turbine engine 10, the temperature of ambient air, the flow rate or pressure of the fuel 32, or the pressure of the exhaust gases 40.

Additionally, in step 204, the measurement signals 110 are received. For example, as indicated above, the controller 104 may be communicatively coupled to the sensor 102. As such, the measurement signals 110 transmitted from the sensor 102 may be received by the controller 104 for subsequent processing of the associated operating parameter measurements.

Furthermore, in step 206, the position of the restriction 54 is controlled based on the measurement signals 110 to regulate the velocity of the gases 36, 40 relative to a predetermined velocity range. For example, the controller 104 may be configured to control the position of the restriction 54. As described, the controller 104 may be configured to control the position of the restriction 54 when the velocity of the gases 36, 40 exceeds the maximum velocity threshold such that the velocity of the gases 36, 40 is reduced. In such instances, the actuator 52 may move the restriction 54 (e.g., the door 56) to the intermediate positions or the restricted position. The controller 104 may also be configured to control the position of the restriction 54 when the velocity of the gases 36, 40 falls below the minimum velocity threshold such that the velocity of the gases 36, 40 is increased. In such instances, the actuator 52 may move the restriction 54 (e.g., the door 56) to the intermediate positions or the unrestricted position.

As discussed above, the system 100 and method 200 disclosed herein regulates the velocity the gases 36, 40 flowing through the gas turbine engine 10 by adjustably impeding or restricting the flow of exhaust gases 40 through the exhaust section 20. In this respect, and unlike with conventional systems and methods, the system 100 and method 200 do not necessarily restrict the mass flow rate of air through the gas turbine engine 10 when controlling/restricting the flow of exhaust gases 40. As such, the system 100 and method 200 provide a smaller impact on the performance of the gas turbine engine 10 than conventional systems and methods, which restrict the flow of the air 26 entering the inlet portion 12. In this respect, the gas turbine engine 10 provides better performance and efficiency than conventional gas turbine engines.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for regulating a velocity of gases in a turbomachine, the turbomachine comprising a turbine, an exhaust section having an exhaust duct that defines a flow area through which exhaust gases flow, and a heat recovery steam generator (HRSG), the method comprising:

detecting, with a sensor in operative association with the turbomachine, an operating parameter associated with the velocity of the gases through the turbomachine;

receiving, with a controller, a measurement signal from the sensor, the signal being associated with the operating parameter; and adjusting, with the controller, a position of a restriction of a damper positioned within the flow area between the turbine and the HRSG to adjust an amount of the flow area impeded by the restriction based on the measurement signal to regulate the velocity of the gases relative to a predetermined velocity range, wherein the damper is operable to adjust the velocity of the gases based on the position of the restriction, wherein the sensor is positioned within the exhaust duct immediately downstream of the turbine and immediately upstream of the restriction.

2. The method of claim 1, wherein the damper is operable to adjust the velocity of the gases while not reducing a mass flow rate of air through the turbomachine.

3. The method of claim 1, further comprising:

adjusting, with the controller, the position of the restriction when the velocity of the gases exceeds a maximum velocity threshold such that the amount of the flow area impeded by the restriction is increased and the velocity of the gases is reduced.

4. The method of claim 1, further comprising:

adjusting, with the controller, the position of the restriction when the velocity of the gases is below a minimum velocity threshold such that the amount of the flow area impeded by the restriction is reduced and the velocity of the gases is increased.

5. The method of claim 1, further comprising:

moving, with an actuator of the damper, the restriction to a restricted position when the velocity of the gases exceeds a maximum velocity threshold, wherein the flow area is not fully impeded when the restriction is in the restricted position; and moving, with the actuator of the damper, the restriction to an unrestricted position when the velocity of the gases is below a minimum velocity threshold.

6. The method of claim 1, further comprising:

moving, with an actuator of the damper, the restriction between an unrestricted position and a restricted position to regulate the velocity of the gases relative to the predetermined velocity range.

7. The method of claim 6, further comprising:

moving, with the actuator of the damper, the restriction to one or more intermediate positions located between the unrestricted position and the restricted position to regulate the velocity of the gases relative to the predetermined velocity range, wherein the amount of the flow area impeded by the restriction is different at each of the one or more intermediate positions of the restriction.

8. The method of claim 1, wherein adjusting the position of the restriction comprises:

rotating a pinon gear coupled to an actuator, the pinon gear engaged with a corresponding rack coupled to a door of the restriction; and adjusting a vertical position of the door.

9. The method of claim 1, wherein the damper is disposed downstream of the turbine and upstream of the HRSG.

10. The method of claim 1, wherein the sensor is an exhaust velocity sensor.

11. The method of claim 10, wherein the exhaust velocity sensor is exposed to exhaust gases and is one of a flow meter or a pitot tube.

12. The method of claim 1, wherein the sensor is an exhaust pressure sensor.

13. The method of claim 12, wherein the exhaust pressure sensor is a diaphragm pressure transducer.

14. The method of claim 1, further comprising:

determining which of an unrestricted position, a restricted position, or an intermediate position the restriction should be located based on a look-up table, the look-up table including a first table of values and a second table of values, wherein each value in the first table of values corresponds to a velocity of the exhaust gases, wherein each value in the second table of values corresponds to one of the unrestricted position, the restricted position, or the intermediate position.

15. The method of claim 14, further comprising:

selecting a first value from the first table of values based on the velocity of exhaust gases; and determining the position of the restriction from the second table based on the selected first value.

16. The method of claim 1, further comprising:

determining the position of the restriction based on one or more mathematical functions.

* * * * *